United States Patent
Anglin et al.

(10) Patent No.: US 9,313,284 B2
(45) Date of Patent: Apr. 12, 2016

(54) SMART POSTING WITH DATA ANALYTICS AND SEMANTIC ANALYSIS TO IMPROVE A MESSAGE POSTED TO A SOCIAL MEDIA SERVICE

(71) Applicant: International Business Machines Corporation, Armonk, NY (US)

(72) Inventors: Howard N. Anglin, Austin, TX (US); Irgelkha D. Mejia, Austin, TX (US); Nicholas J. Ruegger, Austin, TX (US); Yvonne M. Young, Elgin, TX (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 13/826,816

(22) Filed: Mar. 14, 2013

(65) Prior Publication Data
US 2014/0278356 A1 Sep. 18, 2014

(51) Int. Cl.
 H04L 29/08 (2006.01)
 G06F 17/27 (2006.01)
 H04L 12/18 (2006.01)
(52) U.S. Cl.
 CPC ............ H04L 67/22 (2013.01); G06F 17/2785 (2013.01); H04L 12/1813 (2013.01)
(58) Field of Classification Search
 CPC ......... G06F 17/20; G06F 17/21; G06F 17/27; G06F 17/274; G06F 17/2785; H04L 12/1813
 USPC ........... 704/1, 9; 709/204, 206; 715/256, 758
 See application file for complete search history.

(56) References Cited

U.S. PATENT DOCUMENTS

| 6,665,656 | B1 | 12/2003 | Carter | |
|---|---|---|---|---|
| 7,844,668 | B2 * | 11/2010 | Canning et al. | 709/206 |
| 7,890,860 | B1 * | 2/2011 | Thrasher et al. | 715/260 |
| 7,949,715 | B2 * | 5/2011 | Maruyama | 709/206 |
| 8,515,049 | B2 * | 8/2013 | Chavez et al. | 379/265.02 |
| 8,612,202 | B2 * | 12/2013 | Kawai et al. | 704/1 |
| 8,949,343 | B2 | 2/2015 | Shen et al. | |
| 2004/0088157 | A1 | 5/2004 | Lach et al. | |
| 2007/0038619 | A1 | 2/2007 | Norton et al. | |
| 2008/0208860 | A1 | 8/2008 | Galtier | |
| 2008/0294631 | A1 | 11/2008 | Malhas et al. | |

(Continued)

OTHER PUBLICATIONS

US Patent Application, dated Sep. 29, 2014, for U.S. Appl. No. 14/500,585 (54.99C1), filed Sep. 29, 2014, entitled "Smart Posting With Data Analytics", invented by Howard N. Anglin et al., Total 30 pages.

(Continued)

*Primary Examiner* — Martin Lerner
(74) *Attorney, Agent, or Firm* — Janaki K. Davda; Konrad, Raynes, Davda and Victor LLP

(57) ABSTRACT

Provided are techniques for smart posting with data analytics. A message is received before the message is posted to a social media service. The message is analyzed using data analytics to obtain analysis results. The obtained analysis results are compared to similar analysis results stored for at least one pre-existing message. For one or more correlations between the message and at least one pre-existing message, one or more contributing terms that have semantic meaning within a context of the social media service are determined. Based on the one or more contributing terms, one or more suggestions for improving the message are generated. The message is modified based on the one or more suggestions.

14 Claims, 6 Drawing Sheets

(56) References Cited

U.S. PATENT DOCUMENTS

| | | | |
|---|---|---|---|
| 2008/0301136 A1 | 12/2008 | De Pauw et al. | |
| 2008/0306959 A1 | 12/2008 | Spivack et al. | |
| 2009/0144248 A1* | 6/2009 | Treadgold | G06F 17/2785 715/700 |
| 2010/0070485 A1 | 3/2010 | Parsons et al. | |
| 2011/0125793 A1 | 5/2011 | Erhart et al. | |
| 2011/0137845 A1 | 6/2011 | Ward | |
| 2011/0173214 A1 | 7/2011 | Karim | |
| 2011/0258561 A1 | 10/2011 | Ladouceur et al. | |
| 2012/0096546 A1 | 4/2012 | Dilley et al. | |
| 2012/0150979 A1* | 6/2012 | Monaco | 709/206 |
| 2012/0197814 A1 | 8/2012 | Lin | |
| 2012/0209726 A1 | 8/2012 | Dean et al. | |
| 2012/0265806 A1* | 10/2012 | Blanchflower et al. | 709/204 |
| 2012/0323928 A1* | 12/2012 | Bhatia | 707/748 |
| 2013/0046791 A1* | 2/2013 | Markman | G06F 17/274 707/794 |
| 2013/0047099 A1* | 2/2013 | Markman | H04L 12/1827 715/758 |
| 2013/0124437 A1 | 5/2013 | Pennacchiotti et al. | |
| 2013/0138671 A1* | 5/2013 | Cleaver et al. | 707/758 |
| 2013/0151629 A1* | 6/2013 | DeLuca et al. | 709/206 |
| 2013/0159443 A1* | 6/2013 | Dellenbach et al. | 709/206 |
| 2013/0246067 A1* | 9/2013 | Mailhot | G06F 19/3487 704/260 |
| 2013/0282841 A1 | 10/2013 | Bates et al. | |
| 2013/0290436 A1 | 10/2013 | Martin et al. | |
| 2013/0325945 A1 | 12/2013 | Jayaram et al. | |
| 2014/0040773 A1* | 2/2014 | Sanghavi et al. | 715/753 |
| 2014/0088954 A1* | 3/2014 | Shirzadi | G06F 17/24 704/9 |
| 2014/0108562 A1* | 4/2014 | Panzer | 709/206 |
| 2014/0136323 A1* | 5/2014 | Zhang | G06F 17/30483 705/14.53 |
| 2014/0181692 A1* | 6/2014 | Gupta | 715/753 |
| 2014/0195549 A1 | 7/2014 | Ahn et al. | |
| 2014/0229154 A1* | 8/2014 | Leydon | G06F 17/2836 704/2 |
| 2014/0258503 A1* | 9/2014 | Tong | H04L 12/1827 709/224 |
| 2014/0280614 A1 | 9/2014 | Alakuijala et al. | |
| 2015/0019647 A1* | 1/2015 | Anglin | G06F 17/2785 709/204 |

OTHER PUBLICATIONS

Preliminary Amendment, dated Sep. 29, 2014, for U.S. Appl. No. 14/500,585 (54.99C1), filed Sep. 29, 2014, invented by Howard N. Anglin et al., Total 5 pages.

Altantawy, M., A. Rafea, and S. Aly, "Summarizing Online Discussions by Filtering Posts", IEEE IRI 2009, Jul. 1012, 2009, Total 2 pp.

Harris, D., "IBM Targets the Future of Social Media Analytics" [online], [Retrieved on Oct. 25, 2012]. Retrieved from the Internet at <URL: http://gigaom.com/2011/04/28/ibm-targets-the-future-of-social-media-analytics/>, Apr. 28, 2011, Total 8 pp.

IP.Com et al., "System for Providing Invisibility in a Social Networks While Preserving the Content of the Discussions", Jul. 24, 2012, Total 5 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Office Action, dated Aug. 25, 2015, for U.S. Appl. No. 14/500,585, filed Sep. 29, 2014, invented by Matthew J. Anglin et al., Total 23 pages.

Response to Office Action, dated Oct. 1, 2015, for U.S. Appl. No. 14/500,585, filed Sep. 29, 2014, invented by Matthew J. Anglin et al., Total 9 pages.

Notice of Allowance, dated Nov. 6, 2015, for U.S. Appl. No. 14/500,585, filed Sep. 29, 2014, invented by Matthew J. Anglin et al., Total 16 pages.

\* cited by examiner

SMART POSTING WITH DATA ANALYTICS AND SEMANTIC ANALYSIS TO IMPROVE A MESSAGE POSTED TO A SOCIAL MEDIA SERVICE

FIELD

Embodiments of the invention relate to smart posting with data analytics.

BACKGROUND

Social media may be described as an electronic means of communicating or sharing of information and ideas over a network (e.g., the internet) or means of interactions among people in virtual, on-line communities to create, share, and exchange information and ideas. A post may be described as a message submitted in the context of social media (e.g., submitted to a social discussion service).

With so many users leveraging social media, many posts may be made regarding the same topic. Thus, there is redundancy of these posts, which leads to users being inundated with similar posts.

SUMMARY

Provided is a method, computer program product, and computer system for smart posting with data analytics. A message is received, using a processor of a computer, before the message is posted to a social media service. The message is analyzed, using the processor of the computer, using data analytics to obtain analysis results. The obtained analysis results are compared, using the processor of the computer, to similar analysis results stored for at least one pre-existing message. For one or more correlations between the message and at least one pre-existing message, one or more contributing terms that have semantic meaning within a context of the social media service are determined using the processor of the computer. Based on the one or more contributing terms, one or more suggestions for improving the message are generated using the processor of the computer. The message is modified, using the processor of the computer, based on the one or more suggestions.

Provided is a computer program product for smart posting with data analytics. The computer program product comprises a computer readable storage medium having program code embodied therewith, the program code executable by at least one processor to: receive, by the at least one processor, a message before the message is posted to a social media service; analyze, by the at least one processor, the message using data analytics to obtain analysis results; compare, by the at least one processor, the obtained analysis results to similar analysis results stored for at least one pre-existing message; for one or more correlations between the message and the at least one pre-existing message, determine, by the at least one processor, one or more contributing terms that have semantic meaning within a context of the social media service; based on the one or more contributing terms, generate, by the at least one processor, one or more suggestions for improving the message; and modify, by the at least one processor, the message based on the one or more suggestions.

Provided is a computer system for smart posting with data analytics. The computer system includes one or more processors, one or more computer-readable memories, and one or more computer-readable, tangible storage devices, and program instructions, stored on at least one of the one or more computer-readable, tangible storage devices for execution by at least one of the one or more processors via at least one of the one or more memories, to: receive a message before the message is posted to a social media service; analyze the message using data analytics to obtain analysis results; compare the obtained analysis results to similar analysis results stored for at least one pre-existing message; for one or more correlations between the message and the at least one pre-existing message, determine one or more contributing terms that have semantic meaning within a context of the social media service; based on the one or more contributing terms, generate one or more suggestions for improving the message; and modify the message based on the one or more suggestions.

BRIEF DESCRIPTION OF THE SEVERAL VIEWS OF THE DRAWINGS

Referring now to the drawings in which like reference numbers represent corresponding parts throughout:

FIG. 2 is formed by FIGS. 2A and 2B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
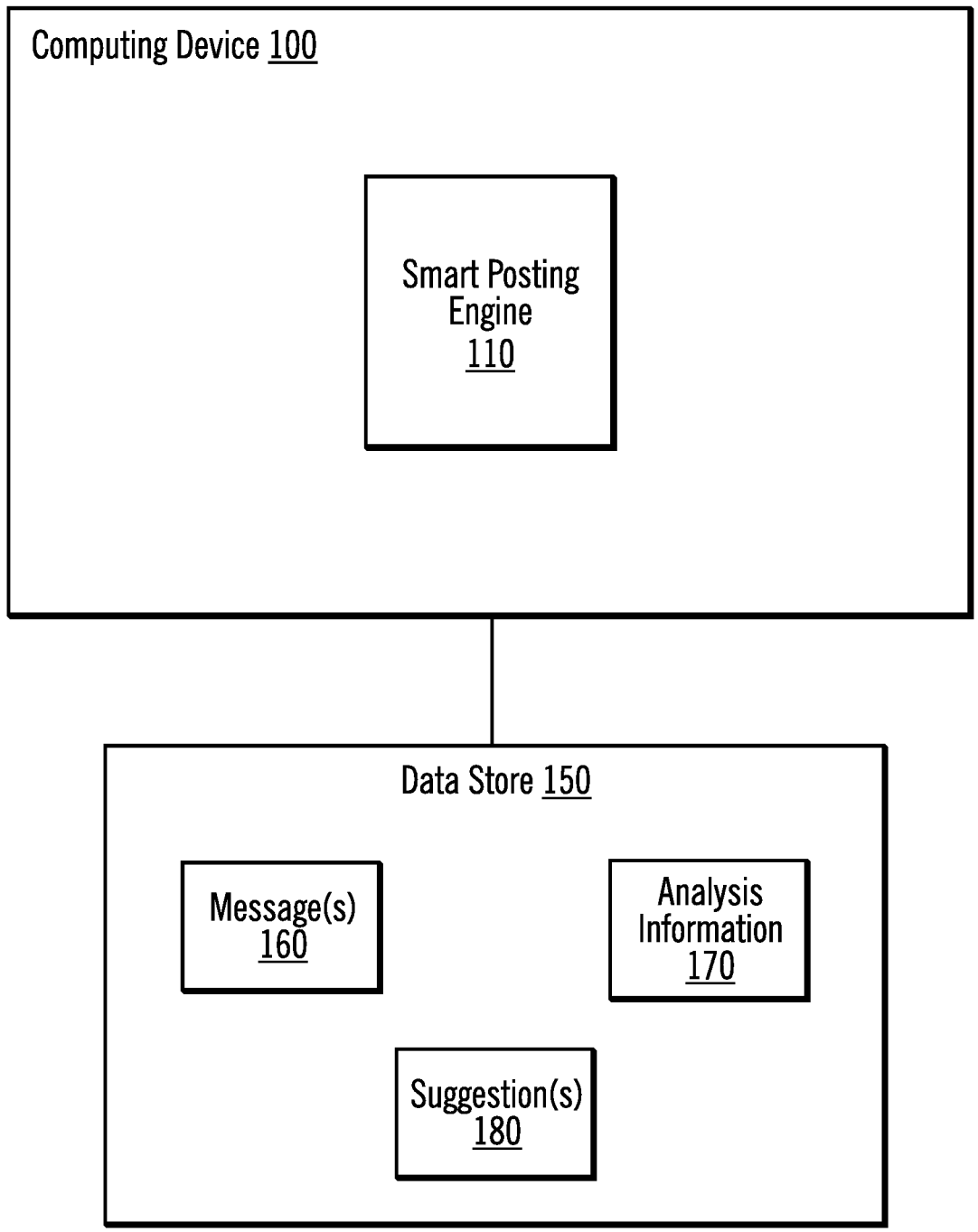
FIG. 1 illustrates a computing environment in accordance with certain embodiments.

FIG. 1 illustrates a computing environment in accordance with certain embodiments. A computing device 100 includes a smart posting engine 110. The computing device 100 is coupled to a data store 150. The data store 150 includes one or more messages 160 (e.g., pre-existing messages), analysis information 170, and one or more suggestions 180. The smart posting engine 110 uses the analysis information 170 to analyze a message 160 and provide suggestions 180 to the user who generated the message 160.

The smart posting engine 110 offers users options to go along with their posts in order to increase the value of the posts. These options may reduce redundancy by providing alerts to users about additional messages that have been posted (by the same or other users), supplemental information on the topic of the message to ensure post content accuracy, and advice to properly tag the message.

Figure 2A:
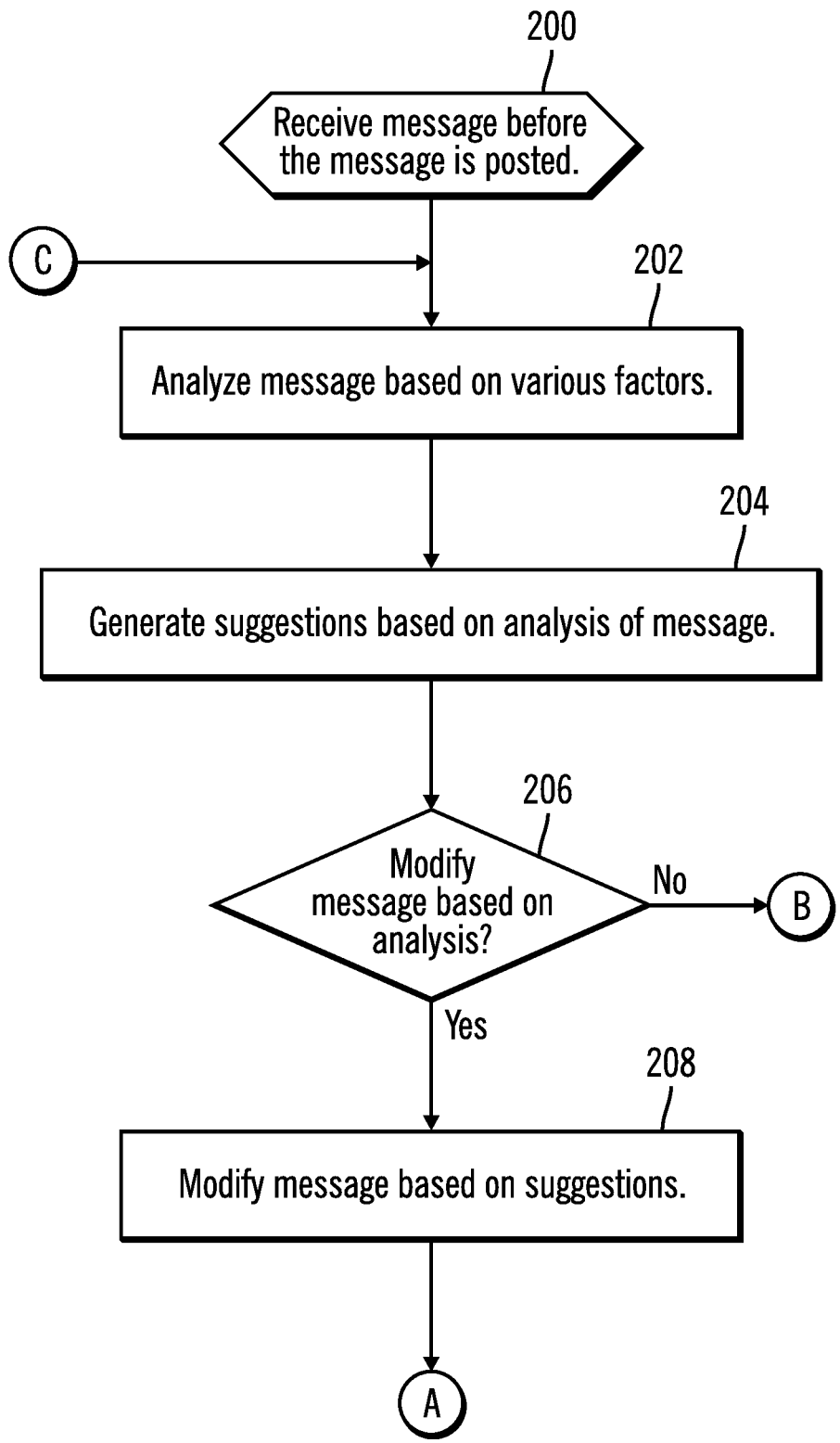
FIG. 2 illustrates operations for analyzing a message and providing suggestions in accordance with certain embodiments.
Figure 2B:
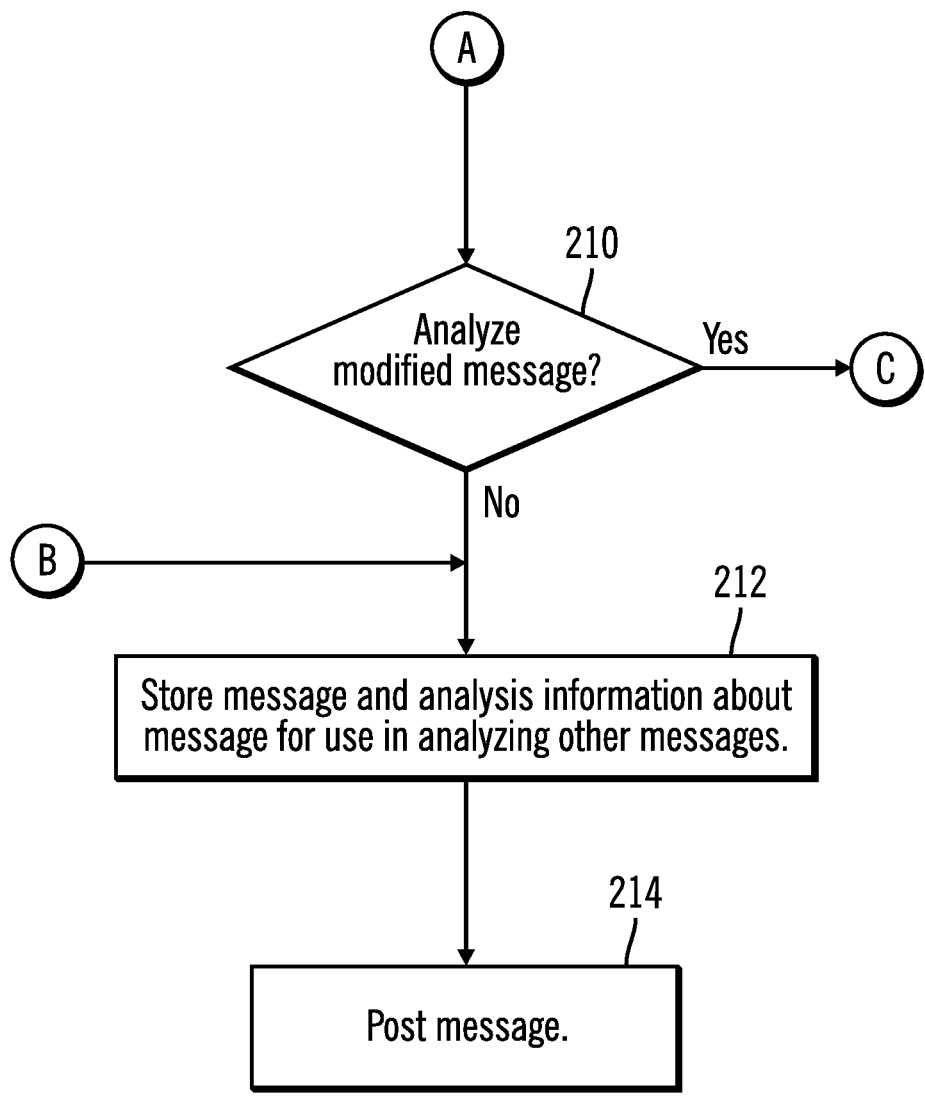

FIG. 2 illustrates operations for analyzing a message and providing suggestions in accordance with certain embodiments. FIG. 2 is formed by FIGS. 2A and 2B. Control begins at block 200 with the smart posting engine 110 receiving a message before the message is posted. In certain embodiments, a user enters a comment regarding a topic for posting, and that comment is the message. As another example, a user enters a questions or requests assistance, comments, opinions, annotations, etc.

In block 202, the smart posting engine 110 analyzes the message based on various factors. In certain embodiments, the smart posting engine 110 uses data analytics (e.g., text analytics or other data mining techniques) to analyze the message.

In certain embodiments, the smart posting engine 110 uses data analytics to analyze a message, compares the results of those analytics to similar results of analytics performed on a pre-existing body of other messages, and, for each strong correlation between the message and the existing body of messages, determines strong contributing terms that have semantic meaning within the context of the social media service (e.g., cross-references, hashtags, names, locations, or event, etc.), and provides a ranked list of suggestions (e.g., improvements) to the message based on the strengths of the correlations (e.g., either by modifying elements of the original message or by adding additional content or meta-information to the message). In certain embodiments, text and data that appear to be used contextually in a same manner (e.g., keywords, phrases, names, places, events or hashtags, etc.) may be said to have a correlation. The more commonalities between the received/analyzed message and an existing message in the body of messages, the stronger the correlation between the message and the existing message. In certain embodiments, semantic meaning may be described as determining a user's intention of terms (e.g., by translating slang, metaphors, analogies to real meaning to match in data analysis). Strong contributing terms may be described as those terms that have semantic meaning such that the terms are related to the context of the social media service.

In certain embodiments, the smart posting engine 110 gauges that the user wants to post the message regarding a particular topic, based on factors such as, for example:
- content of the message to be posted by the user;
- content of the messages posted by the user's peers;
- content of messages "in-flight" (i.e., about to be posted by any user);
- content of the messages made by all others who posted;
- level of recognition of an event, news item, etc. (nationwide, local, etc.)

In block 204, the smart posting engine 110 generates suggestions based on analysis of the message. In certain embodiments, the smart posting engine 110 intercepts the message, analyzes the message, and generates suggestions. In certain embodiments, when the user clicks to post the message, the smart posting engine 110 proposes the suggestions to the user.

In certain embodiments, network analytics may be described as comparisons to other postings/data available on the network. In certain embodiments, the smart posting engine 110 generates suggestions, such as the following, based on network analytics related to the message:
- add a person, hashtag, or article to the message?
- add information about another message posted on this topic?
- add a relevant article, link, etc. to the message? (In this case, a user may also review such article, link, etc. and consider speaking about the article, link, etc. in the message.)

In block 206, the smart posting engine 110 determines whether to modify the message. If so, processing continues to block 208, otherwise, processing continues to block 212 (FIG. 2B). In certain embodiments, the smart posting engine 110 automatically modifies the message. In certain embodiments, the smart posting engine 110 modifies the message based on certain factors. For example, the smart posting engine 110 may modify the message (e.g., via an optional feature turned on in cases of misspellings, factually incorrect data or incorrect references, misuse of hashtags or mis-tagging, etc.). In certain embodiments, the user considers the suggestions proposed by the smart posting engine 110 in order to increase the value of the originally intended message and indicates whether or not the message is to be changed. Changing the message based on the suggestions is intended to make the message a smarter posting.

In block 208, the smart posting engine 110 modifies the message based on suggestions. From block 208 (FIG. 2A), processing continues to block 210 (FIG. 2B).

In block 210, the smart posting engine 110 determines whether to analyze the modified message. In certain embodiments, the smart posting engine 110 determines whether to modify the message based on certain factors (e.g., whether the message is relevant, a number of times that the message has already been modified, etc.). In certain embodiments, the smart posting engine 110 assumes that there is a body of meaning (e.g., people writing about a car accident) that remains the same, while peripheral information changes. For example people may include the related injuries, additional lights, stop signs, car improvements, etc, as a result of that car accident. In certain embodiments, the smart posting engine 110 determines whether to modify the message based on user input. If the message is to be modified, processing goes to block 202 (FIG. 2A), otherwise, processing goes to block 212 (FIG. 2B).

In block 212, the smart posting engine 110 stores the message and analysis information about the message for use in analyzing other messages. The other message may be subsequently received messages or previously received messages (e.g., that are analyzed to assist the user in learning to post smarter messages). In certain embodiments, the analysis information includes, for example, common correct or incorrect references, grammar, style, associations, hashtags, names, places, events, historical facts associated to such postings, etc.

In block 214, the message is posted (either by the smart posting engine 110 or by the user). In certain embodiments, the message has been modified in block 208 one or more times before being posted.

In certain embodiments, in block 210, the smart posting engine 110 performs a "sanity" check on the new message after modification to ensure that this modified message still is relevant and makes sense. For example, during a football game, assume that the power goes out, which prompted numerous postings about the power. For a user who did not know how to post, the user may type in: "#footballgame#outage #Dallas, and smart posting engine 110 may suggest that this should be changed to #footballgame#outage#NewOrleans. If the user accepts this modification, the smart posting engine 110 validates any other changes and posts the message. As this message is posted, the message is now stored for use in analyzing other messages.

In certain embodiments, the smart posting engine 110 assists users in improving the quality of a message to be posted to a social discussion service. In certain embodiments, the smart posting engine 110 provides user interfaces so those improvements may be made by the user as part of the posting process.

In certain embodiments, the smart posting engine 110 offers users options to go along with messages to be posted in order to increase the value of the messages. These options that may reduce redundancy by providing alerts to additional messages, by providing supplemental information on the topic of the message to help the user ensure message content accuracy, and by providing advice to properly tag the individual message.

In certain embodiments, the smart posting engine 110 enables a user to enter a message (e.g., a comment) regarding a topic for posting, gauges that the user wants to post the message regarding the topic, and, in response to the user entering the post (e.g., by clicking an "enter" button on a keyboard or with a mouse click), providing suggestions to the user. The user may then take these suggestions into consideration to modify the message to provide a smarter posting.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 3:
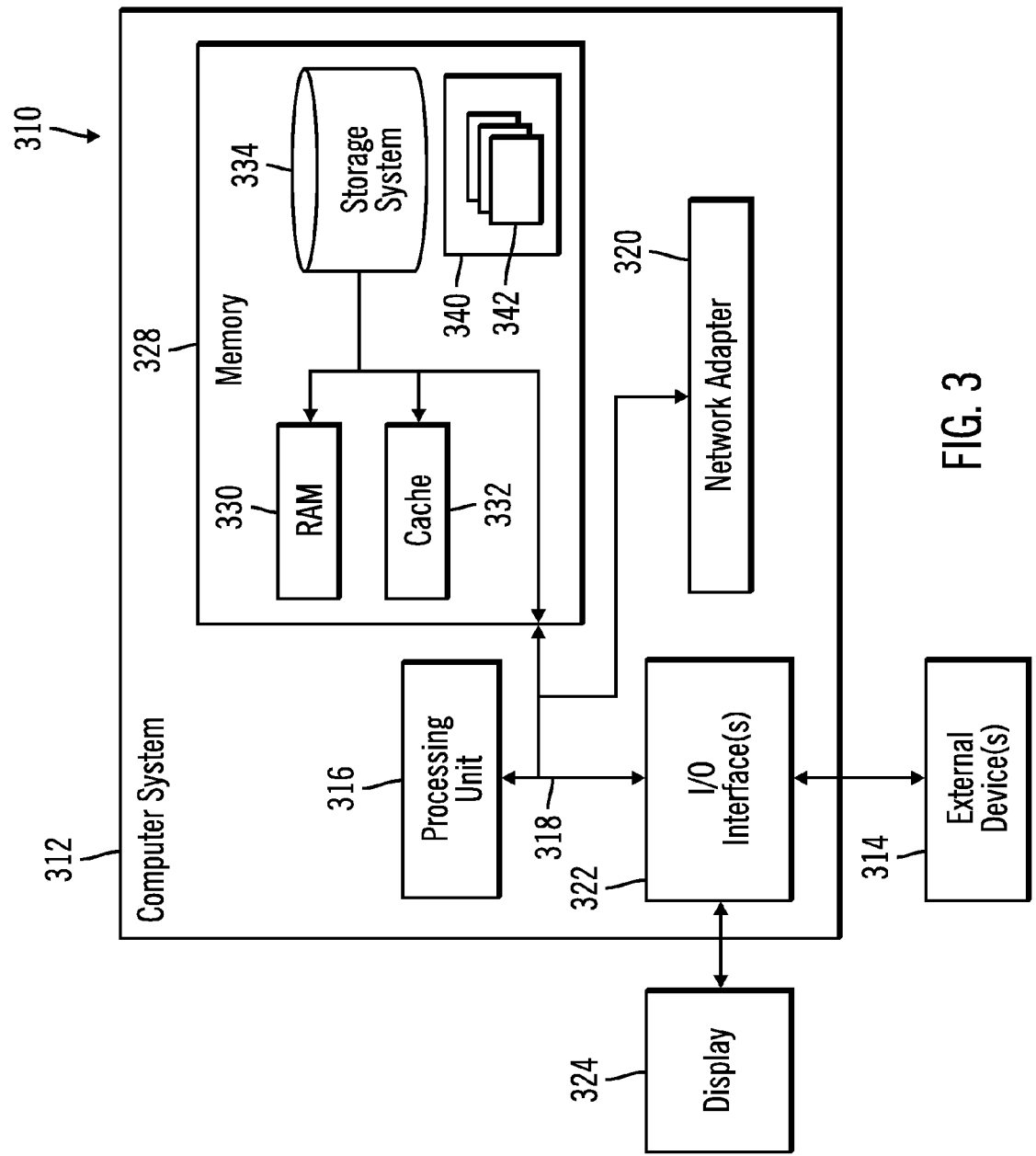
FIG. 3 illustrates a cloud computing node in accordance with certain embodiments.

Referring now to FIG. 3, a schematic of an example of a cloud computing node is shown. Cloud computing node 310 is only one example of a suitable cloud computing node and is not intended to suggest any limitation as to the scope of use or functionality of embodiments of the invention described herein. Regardless, cloud computing node 310 is capable of being implemented and/or performing any of the functionality set forth hereinabove.

In cloud computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 310 is shown in the form of a general-purpose computing device. The components of computer system/server 312 may include, but are not limited to, one or more processors or processing units 316, a system memory 328, and a bus 318 that couples various system components including system memory 328 to a processor or processing unit 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
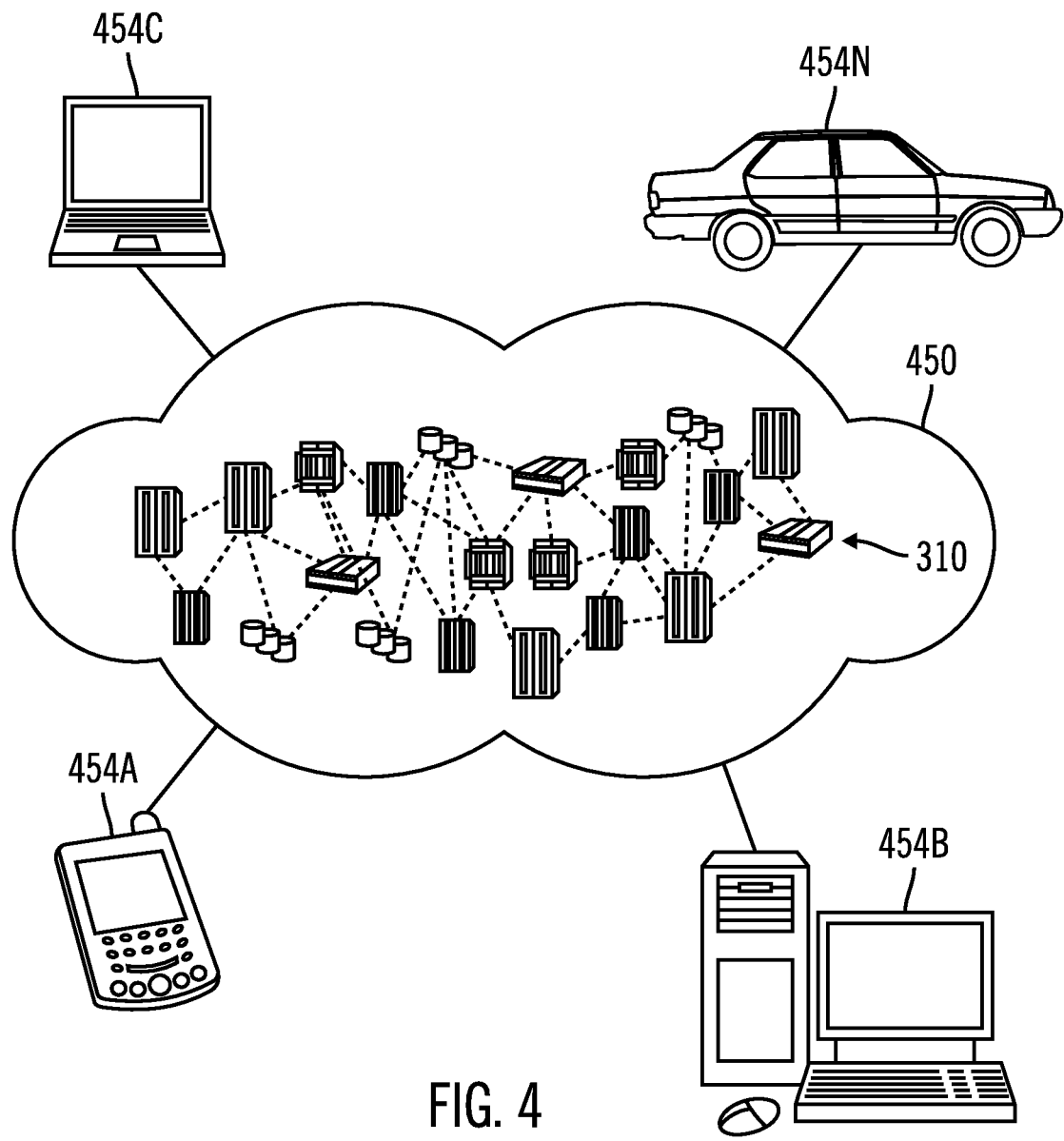
FIG. 4 illustrates a cloud computing environment in accordance with certain embodiments.

Referring now to FIG. 4, illustrative cloud computing environment 450 is depicted. As shown, cloud computing environment 450 comprises one or more cloud computing nodes 310 with which local computing devices used by cloud consumers, such as, for example, personal digital assistant (PDA) or cellular telephone 454A, desktop computer 454B, laptop computer 454C, and/or automobile computer system 454N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 310 and cloud computing environment 450 can communicate with any type of computerized device over any type of network and/or network addressable connection (e.g., using a web browser).

Figure 5:
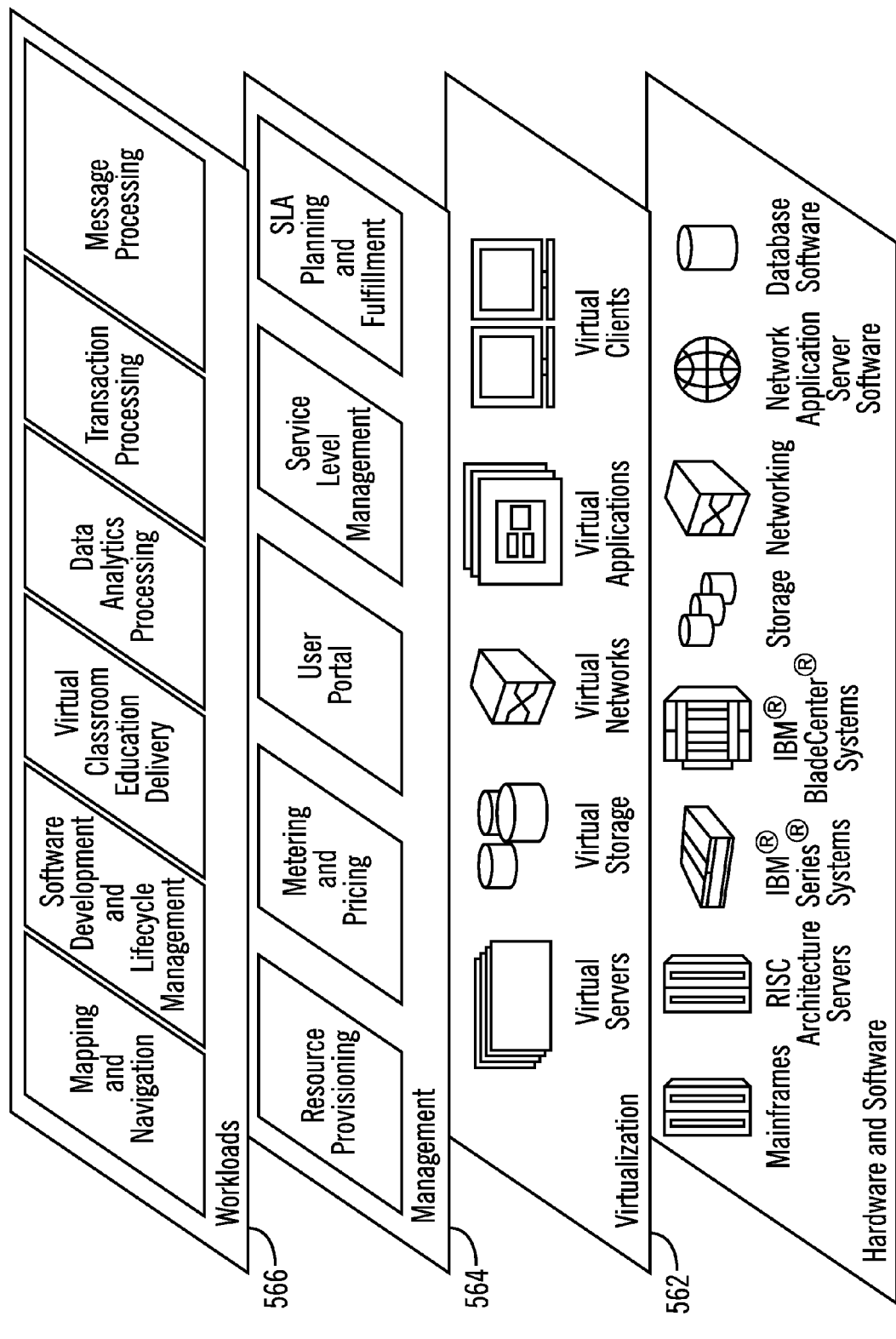
FIG. 5 illustrates abstraction model layers in accordance with certain embodiments.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 562 provides an abstraction layer from which the following examples of virtual entities may be provided: virtual servers; virtual storage; virtual networks, including virtual private networks; virtual applications and operating systems; and virtual clients.

In one example, management layer 564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and message processing.

Thus, in certain embodiments, software or a program, implementing message processing in accordance with embodiments described herein, is provided as a service in a cloud environment.

In certain embodiments, the computing device 100 has the architecture of computing node 310. In certain embodiments, the computing device 100 is part of a cloud environment. In certain alternative embodiments, the computing device 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer program product, the computer program product comprising a non-transitory computer readable storage medium having program code embodied therewith, the program code executable by at least one processor to:

receive, by the at least one processor, a message before the message is posted to a social media service;

analyze, by the at least one processor, the message using data analytics to obtain analysis results;

compare, by the at least one processor, the obtained analysis results to similar analysis results stored for pre-existing messages to identify one or more strong correlations among correlations between the message and the pre-existing messages;

for each of the one or more strong correlations, determine, by the at least one processor, one or more contributing terms that have semantic meaning within a context of the social media service based on translating terms in the message to terms that represent an intended meaning of those terms;

based on the one or more contributing terms, generate, by
the at least one processor, one or more suggestions for
improving the message;

modify, by the at least one processor, the message based on
the one or more suggestions; and determine, by the at least one processor, whether to further
analyze the modified message based on certain factors.

2. The computer program product of claim 1, wherein the
one or more suggestions are provided as a ranked list of
improvements to the message based on strengths of the one or
more correlations.

3. The computer program product of claim 1, wherein the
one or more suggestions indicate at least one of suggestions
for modifying elements of the message and suggestions for
adding additional content to the message, wherein the additional content includes at least one of an article, another
message, and a link.

4. The computer program product of claim 1, wherein the
one or more contributing terms include at least one of a
cross-reference, a hashtag, a name, a location, and an event.

5. The computer program product of claim 1, wherein the
data analytics include text analytics.

6. The computer program product of claim 1, wherein the
program code is executable by the at least one processor to:
store the message and analysis information about the message for use in analyzing other messages.

7. The computer program product of claim 1, wherein a
Software as a Service (SaaS) is configured to perform the
computer program product operations.

8. A computer system, comprising:
one or more processors, one or more computer-readable
memories, and one or more computer-readable, tangible
storage devices; and program instructions, stored on at least one of the one or
more computer-readable, tangible storage devices for
execution by at least one of the one or more processors
via at least one of the one or more memories, to:

receive a message before the message is posted to a social
media service;

analyze the message using data analytics to obtain analysis
results;

compare the obtained analysis results to similar analysis
results stored for pre-existing messages to identify one
or more strong correlations among correlations between
the message and the pre-existing messages;

for each of the one or more strong correlations, determine
one or more contributing terms that have semantic
meaning within a context of the social media service
based on translating terms in the message to terms that
represent an intended meaning of those terms;

based on the one or more contributing terms, generate one
or more suggestions for improving the message;

modify the message based on the one or more suggestions;
and determine whether to further analyze the modified message
based on certain factors.

9. The computer system of claim 8, wherein the one or
more suggestions are provided as a ranked list of improvements to the message based on strengths of the one or more
correlations.

10. The computer system of claim 8, wherein the one or
more suggestions indicate at least one of suggestions for
modifying elements of the message and suggestions for adding additional content to the message, wherein the additional
content includes at least one of an article, another message,
and a link.

11. The computer system of claim 8, wherein the one or
more contributing terms include at least one of a cross-reference, a hashtag, a name, a location, and an event.

12. The computer system of claim 8, wherein the data
analytics include text analytics.

13. The computer system of claim 8, wherein the program
instructions are stored on at least one of the one or more
computer-readable, tangible storage devices for execution by
at least one of the one or more processors via at least one of the
one or more memories to:
store the message and analysis information about the message for use in analyzing other messages.

14. The computer system of claim 8, wherein a Software as
a Service (SaaS) is provided to perform the system operations.

* * * * *